July 21, 1970        C. A. LOMBARDI        3,521,087
CURRENT LIMITING CIRCUIT
Filed May 16, 1969                                         3 Sheets-Sheet 1
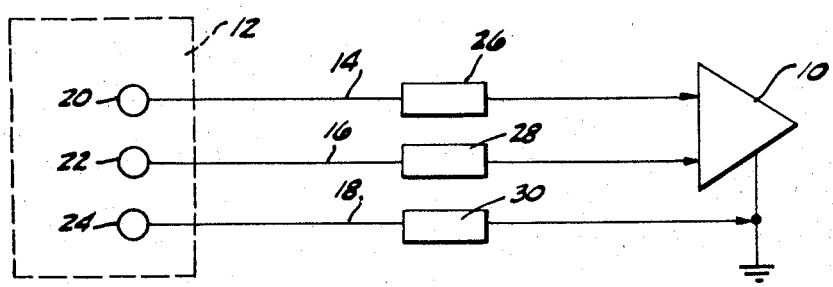
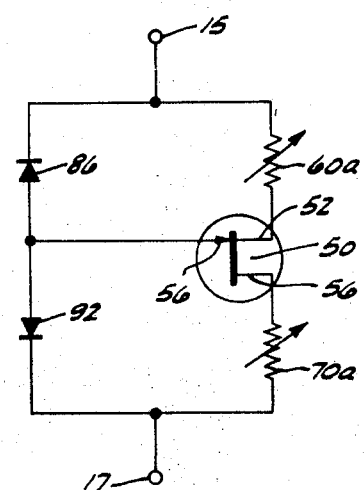
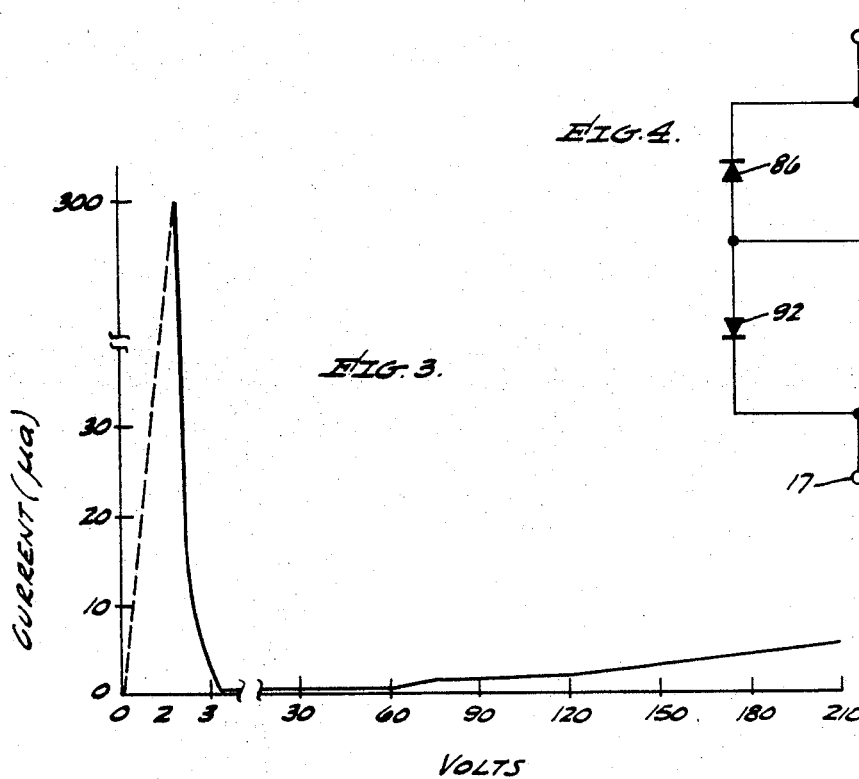
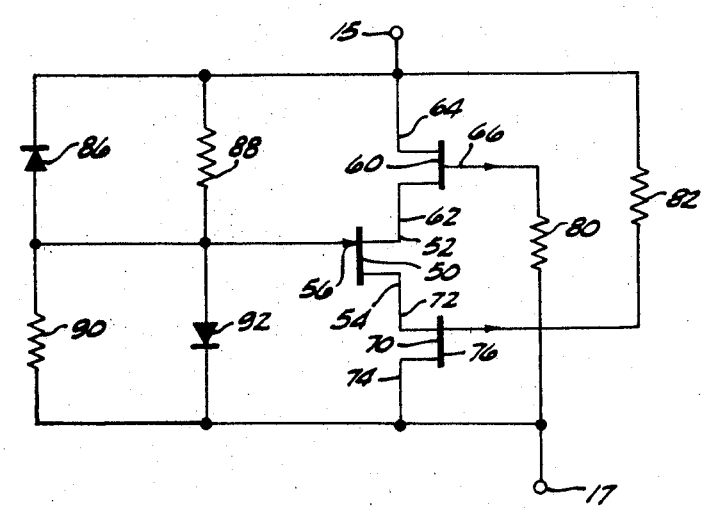
INVENTOR.
CARL A. LOMBARDI,
BY R. E. Geauque
ATTORNEY.

INVENTOR.
CARL A. LOMBARDI,
BY
R. E. Geauque
ATTORNEY.

July 21, 1970 C. A. LOMBARDI 3,521,087
CURRENT LIMITING CIRCUIT

Filed May 16, 1969 3 Sheets-Sheet 3

INVENTOR.
CARL A. LOMBARDI,
BY
R. E. Granger
ATTORNEY.

United States Patent Office 3,521,087
Patented July 21, 1970

3,521,087
CURRENT LIMITING CIRCUIT
Carl A. Lombardi, Glendale, Calif., assignor to Spacelabs, Inc., Van Nuys, Calif., a corporation of California
Filed May 16, 1969, Ser. No. 825,173
Int. Cl. H03k 5/08
U.S. Cl. 307—237                                    6 Claims

ABSTRACT OF THE DISCLOSURE

A current limiter circuit is described which is useful as a safety feature in medical testing equipment or the like. The circuit comprises series coupled field effect transistors with a center field effect transistor biased into conduction. The other field effect transistors are used to control the voltage drops across the center field effect transistor to bias the conduction thereof in an inverse relation to the voltage drop, whereby the current increase changes the impedance in the circuit which directly affects the conduction of the center field effect transistor.

BACKGROUND OF THE INVENTION

Field of the invention

This invention relates to current limiters and more particularly to a novel and improved current limiter useful as a safety feature for medical testing equipment.

Discussion of the prior art

It is widely known in industry to use electrical monitoring systems on individuals to make medical diagnosis thereof. In some cases, it has been found that the safety features must be used in order to prevent harm to the patients in the form of electrical shock when the monitoring equipment is in use. Such electrical shocks may be provided by feedback currents through the lead lines to the patient, and especially if the patient becomes grounded in some manner whereby a circuit is completed to the chassis of the monitoring equipment, for example. Thus, it can be seen that such monitoring equipment is quite desirable in the medical industry but could be potentially dangerous to the patient. This is because, should for some reason a short or malfunction occur in a monitoring system, a patient who is physically attached to the equipment may be disturbed or injured by the electrical currents. If the electrical currents involved are sufficiently high, the harm, of course, would be increased accordingly.

Further, in some situations, a high voltage is being used in the monitoring equipment, sometimes referred to as "defibrillations." Thus, the circuit necessary for such current limiting must also be available to protect the monitoring circuits.

BRIEF DESCRIPTION OF THE INVENTION

Briefly described, the present invention includes a current limiter useful in the lead lines for medical monitoring equipment, or the like. The current limiter includes a first terminal and a second terminal, either of which may be designated as an input or output, as the current limiter herein described may be bi-directional.

A first field effect transistor, for example, is included and is coupled between a first input terminal and the source electrodes of the first field effect transistor. A second field effect transistor is included and has its source electrode coupled to the drain electrode of the first electron discharge device. Biasing means is provided and is coupled to the control electrode of the second field effect transistor for biasing this transistor into conduction, and is dependent upon the voltage supply to the first and second input terminals.

A third field effect transistor may be provided and has its drain electrode coupled to the second terminal and its source electrode coupled to the drain electrode of the second transistor. A control electrode of the first transistor is coupled to the second input terminal and the control electrode of the third transistor is coupled to the first input terminal. Thus, the first and third input terminals have impedance gates to the second field effect transistors and is inversely proportional to the voltage applied to the first and second input terminals.

DESCRIPTION OF THE DRAWINGS

These and other features and advantages will become more apparent to those skilled in the art when taken into consideration with the following detailed description, wherein like reference numerals indicate like and corresponding parts throughout the several views and wherein:

FIG. 1 is a block diagram of the present invention showing the embodiment of the current limiters used in medical applications;

FIG. 2 illustrates an electrical schematic of the current limiter shown in FIG. 1;

FIG. 3 illustrates a waveform of the voltage/current relationships of the current limiter of this invention;

FIG. 4 illustrates an equivalent circuit of the current limiters shown in FIG. 3;

DESCRIPTION OF THE PREFERRED EMBODIMENTS

Figure 5:
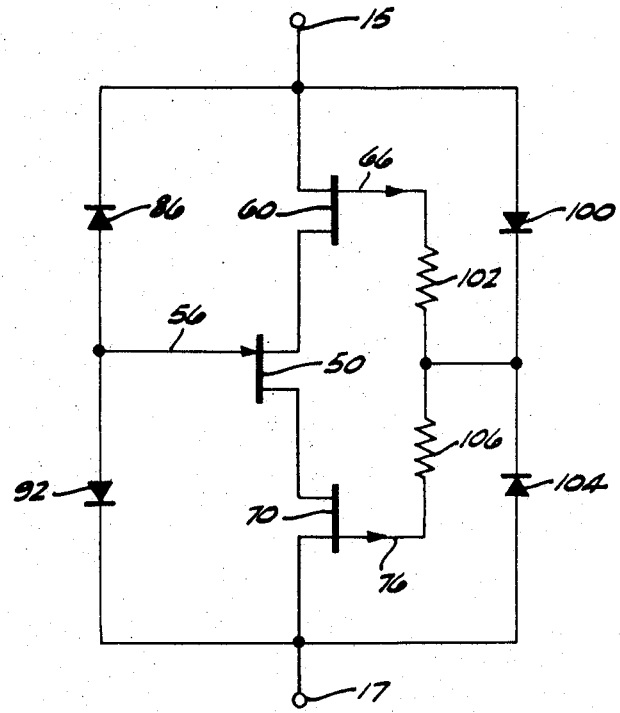
FIGS. 5 and 6 are electrical schematic diagrams of further embodiments of this invention illustrating different biasing means.

Turning now to a more detailed description of this invention there is shown in FIG. 1 a medical monitoring equipment 10 which is coupled to a patient 12 or the like, for which medical diagnosis will be performed thereon. The monitoring equipment 10 is coupled by the lead lines 14, 16 and 18 directly to the terminals 20, 22 and 24, respectively, which are in turn coupled to the patient in a manner well known to those skilled in the art. Current limiters 26, 28 and 30 are coupled in series with the input leads 14, 16 and 18, respectively, to limit the amount of current which can flow from the medical equipment 10 to the terminals 20, 22 and 24 on the patient 12.

Figure 6:
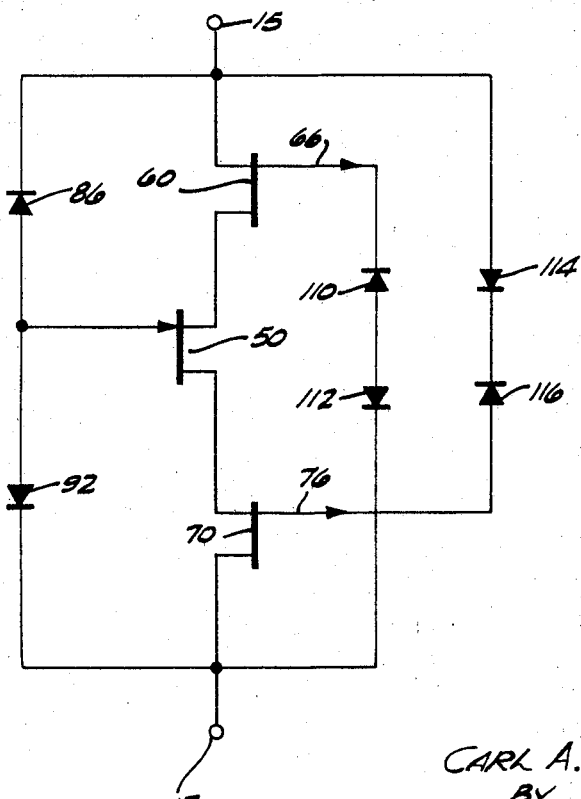

The circuit of this invention, which is found in the current limiters 26, 28 and 30 is shown in schematic form in FIGS. 2, 4 and 6. Referring first to FIG. 2, a field effect transistor 50 has a source electrode 52 and a drain electrode 54. A second field effect transistor 60 includes a drain electrode 62 coupled to the source electrode 52 of field effect transistor 50 and includes a source electrode 64 coupled to a terminal 14, for example. A third field effect transistor includes a source electrode 72 coupled to the drain electrode 54 of field effect transistor 50 and includes a drain electrode 74 coupled to the terminal 17 which may, in turn, be coupled to the electrical monitoring equipment 10, as shown in FIG. 1.

Field effect transistors 60 and 70 may be considered P channel type field effect transistors, and the field effect transistor 50 may be considered an N channel field effect transistor. It should be understood that the polarities and the channels of the field effect transistors 50, 60 and 70 may be reversed, and the biasing applied to the gage electrodes thereof may be of opposite polarities and yet still be within the spirit and scope of this invention.

The gate electrode of field effect transistor 60 is coupled through a resistor 80 to the terminals 17. A gate electrode 76 of the field effect transistor 70 is coupled through a resistor 82 to the terminal 15. Thus, the voltages applied to either the terminal 15 and 17 will provide an inverse effect upon the conduction of the field effect transistors 60 and 70 by varying the impedance thereof to the source and drain of the field effect transistor 50, respectively.

The N channel field effect transistor 50 has its gate electrode 56 coupled to the terminals 15 and 17 through the diode 86, resistor 88 is coupled in parallel to terminal 15, and the resistor 90 and the diode 92 are coupled in parallel and to the terminal 17. Voltages applied to these terminals will keep the current limiter of this invention conducting through the field effect transistor 50. As the currents increase in any direction between terminals 15 and 17, the transistor 50 is continually biased at its gate electrode, but the impedances change in a manner directly proportional to the current flow.

Referring to FIG. 4, there is shown an equivalent simplified circuit of this invention whereby only a single field effect transistor 50 is illustrated as such. The field effect transistor 60 of FIG. 2 is shown in this view in the form of a variable resistor 60A and the field effect transistors 70 is shown in form of a variable resistor 70A. As the currents increase, the variable resistors increase, changing the impedance to the field effect transistor 50 and causing "pinch-off" of the current flow therethrough.

The graph shown in FIG. 3 illustrates the sharp cut-off of current in relation to the voltage applied to the terminals 15 and 17, whereby the current flow will increase to 300 microamps until three volts, or better, appear across the terminals 15 and 17. Thereafter, the voltage may increase a considerable amount with only a negligible amount of current increase.

Referring now to FIG. 4, there is illustrated a still further embodiment of this invention, and whereby a different arrangement is provided for controlling the "pinch-off" of field effect transistor 50 by changing the impedance of the current flow through field effect transistors 60 and 70. In this embodiment a diode 100 is coupled to the terminal 15 through a resistor 102 to the gate electrode 66 of field effect transistor 60. The terminal 17 is coupled through a diode 104 to a junction which is coupled to the cathode electrode of diode 100 and through resistor 106 to the gate electrode 76 of field effect transistor 70. In this method the currents provided by voltages applied to terminals 15 and 17 have an equal effect on "pinch-off" to field effect transistors 60 and 70, and thereby control the impedances into the source electrode and the drain electrode of field effect transistor 50 and regulating the "pinch-off" thereof by the voltage relationship between the drain or source and the gate electrode 56 thereof.

With reference now to FIG. 5, there is shown a further embodiment of this invention, whereby a pair of diodes 110 and 112 have their anode electrodes coupled together and the cathode electrode of diode 110 is coupled to the gate electrode 66 of field effect transistor 60. The cathode electrode of diode 112 is coupled to the terminal 17. Conversely, a pair of diodes 114 and 116 have their cathodes coupled together and the anode of diode 114 is coupled to the terminal 15, and the anode of diode 116 is coupled to the gate electrode 76 of field effect transistor 70.

Figure 7:
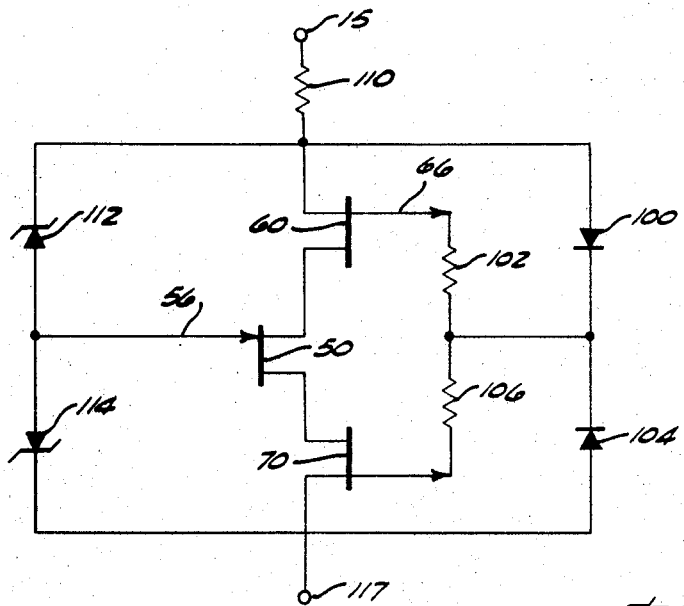
FIG. 7 is an electrical schematic diagram of a further embodiment of this invention with defibrillation protection.
Figure 8:
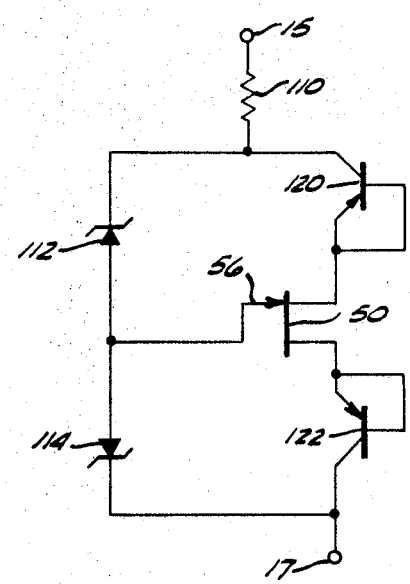
FIG. 8 is a further embodiment of this invention using different components.
Figure 9:
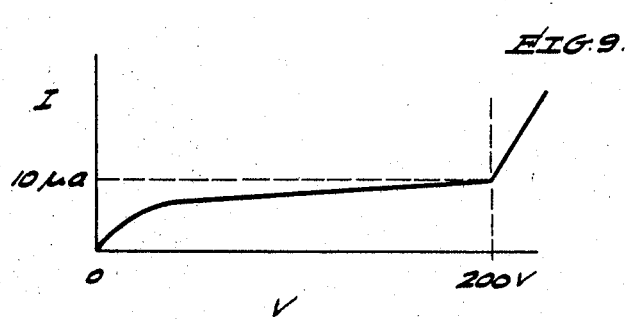
FIG. 9 illustrates the voltage/current relationship of the current limiter set forth in FIG. 8.

Referring now to FIG. 7, there is shown an embodiment of this invention useful in the aforesaid defibrillation protection. In this embodiment a resistor 100 is coupled in series with the terminal 15. The diodes 86 and 92 are replaced with a pair of Zener diodes 102 and 104, respectively. These diodes then act as voltage limiters to the gate electrodes 56 of field effect transistor 50. Thus, in this embodiment, the limiter circuit is not only current responsive but also voltage responsive.

Note in all embodiments set forth herein, it is possible to insert the resistor and Zenor diodes and make the limiter voltage responsive. These Zener diodes then limit voltage across whole circuit and not cause damage to the components by high voltage surges.

Having thus described the preferred embodiment of this invention, what is claimed is:

1. A current limiter circuit comprising:
   a first terminal and a second terminal and being adapted to receive electrical energy;
   a first field effect transistor including a source electrode, a drain electrode and a gate electrode, the source electrode of said first field effect transistor being coupled to said first terminal;
   a second field effect transistor including a source electrode, a drain electrode and a gate electrode, the drain electrode of said second field effect transistor being coupled to said second terminal;
   a third field effect transistor including a source electrode, a drain electrode and a gate electrode, the source electrode of said third field effect transistor device being coupled to the drain electrode of said first field effect transistor, the drain electrode of said third field effect transistor being coupled to the source electrode of said second field effect transistor;
   biasing means coupled to the gate electrode of said third field effect transistor for biasing said second field effect transistor into conduction; and
   current control means coupled to the gate of said first and said second field effect transistors and responsive to current flow in said first and second terminals for changing the impedance within said first and second field effect transistors according to the current levels of the electrical energy of said first and second terminals, said current control means including a first resistive element coupled between the first terminal and the gate electrode of said second field effect transistor; and a second resistive element coupled between the second terminal and the gate electrode of said first field effect transistor.

2. The current limiter as defined in claim 1 and wherein said biasing means including a first and second back to back coupled diodes coupled in parallel with the first and second terminals and the gate electrode of said third field effect transistor being coupled to a junction between said first and second diodes.

3. The current limiting circuit as defined in claim 1 wherein said current control means including:
   a pair of diodes coupled in series and in opposing polarities and between said first and second terminals; and
   a pair of resistors coupled in series and between the gate electrode of said first and second field effect transistors,
   the junction between said pair of diodes being coupled to the junction between said pair of resistors.

4. The current limiting circuit as defined in claim 1 wherein said current control means including:
   a first pair of diodes coupled in series and between the gate electrodes of said first field effect transistor and said second terminal; and
   a second pair of diodes coupled in series and between the gate electrodes of said second field effect transistor and said first terminal.

5. A bi-directional current limiter for limiting the current between a first terminal and a second terminal, said limiter comprising:
   a first field effect transistor including a source drain gate;
   a first impedance regulating means coupled between said first terminal and the source of said field effect transistor and responsive to the voltage on said second terminal for regulating the impedance across said field effect transistor;
   said first impedance regulating means including a first transistor having an emitter electrode coupled to the source electrode of said field effect transistor, a collector electrode coupled to said first terminal and a base electrode coupled to the emitter electrode of said first transistor;

a second impedance regulating means coupled between said first terminal in the drain of said first field effect transistor and responsive to the voltage of said first terminal for regulating the impedance across said field effect transistor;

said second impedance regulating means including a second transistor having an emitter electrode coupled to the drain electrode of said field effect transistor and a collector electrode coupled to said second terminal and a base electrode coupled to the emitter electrode of said second transistor; and biasing means coupled to the gate of said field effect transistor and between the first and second terminal for applying a bias current to said field effect transistor.

6. A bi-directional current limiter as defined in claim 5 wherein said biasing means includes a pair of Zener diodes coupled in series and in opposing polarities and coupled between said first and said second terminals and the junction between said Zener diodes being coupled to the gate electrode of said field effect transistor.

References Cited

UNITED STATES PATENTS

| 2,073,428 | 3/1937  | Schmid      | 128—414   |
|-----------|---------|-------------|-----------|
| 2,922,945 | 1/1960  | Norris et al. | 323—9 X |
| 3,024,422 | 3/1962  | Jansson     | 307—304   |
| 3,174,093 | 3/1965  | Finkelstein | 323—9     |
| 3,195,533 | 7/1965  | Fischer     | 128—2.1   |
| 3,320,947 | 5/1967  | Knoll       | 128—2.1   |
| 3,369,129 | 2/1968  | Wolterman   | 307—237   |
| 3,412,266 | 11/1968 | Tarico      | 307—251   |
| 3,303,413 | 2/1967  | Warner      | 323—4     |

JOHN S. HEYMAN, Primary Examiner

J. D. FREW, Assistant Examiner

U.S. Cl. X.R.

307—202, 251, 279, 304; 323—4, 9